US010840604B2

(12) United States Patent
Jan et al.

(10) Patent No.: US 10,840,604 B2
(45) Date of Patent: Nov. 17, 2020

(54) ANTENNA SYSTEM

(71) Applicant: Wistron NeWeb Corporation, Hsinchu (TW)

(72) Inventors: Cheng-Geng Jan, Hsinchu (TW); Chieh-Sheng Hsu, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 0 days.

(21) Appl. No.: 16/568,216

(22) Filed: Sep. 11, 2019

(65) Prior Publication Data

US 2020/0106190 A1    Apr. 2, 2020

(30) Foreign Application Priority Data

Sep. 27, 2018  (TW) .............................. 107133945 A

(51) Int. Cl.
| | |
|---|---|
| *H01Q 21/00* | (2006.01) |
| *H01Q 1/42* | (2006.01) |
| *H04B 7/06* | (2006.01) |
| *H01Q 1/38* | (2006.01) |
| *H04W 72/04* | (2009.01) |

(52) U.S. Cl.
CPC ........... *H01Q 21/0068* (2013.01); *H01Q 1/38* (2013.01); *H01Q 1/422* (2013.01); *H01Q 1/425* (2013.01); *H04B 7/0617* (2013.01); *H04W 72/046* (2013.01)

(58) Field of Classification Search
CPC ...... H01Q 21/0068; H01Q 1/422; H01Q 1/38; H01Q 1/425; H01Q 3/36; H01Q 21/0075; H01Q 9/0457; H01Q 21/28; H01Q 21/065; H01Q 1/24; H04B 7/0617; H04W 72/046

See application file for complete search history.

(56) References Cited

U.S. PATENT DOCUMENTS

| | | | | |
|---|---|---|---|---|
| 6,448,930 | B1* | 9/2002 | Judd ...................... | H01Q 1/007 343/700 MS |
| 2005/0110683 | A1* | 5/2005 | Song ...................... | H01Q 25/00 343/700 MS |
| 2008/0088510 | A1* | 4/2008 | Murata .................. | H01Q 19/28 343/700 MS |
| 2017/0229774 | A1* | 8/2017 | Schuehler ................ | H01Q 3/24 |
| 2018/0026379 | A1* | 1/2018 | Barker .................. | H01Q 21/065 343/844 |
| 2018/0233820 | A1* | 8/2018 | Chen .................... | H01Q 21/205 |

* cited by examiner

*Primary Examiner* — Renan Luque
(74) *Attorney, Agent, or Firm* — Winston Hsu

(57) ABSTRACT

An antenna system for receiving and transmitting wireless signals includes a first complex antenna including a first dielectric layer, a first metal grounding sheet, first to fourth antenna arrays and a first transmission line device for transmitting radio-frequency signals to the first to fourth antenna arrays, a second complex antenna including a second dielectric layer, a second metal grounding sheet, fifth to eighth antenna arrays and a second transmission line device for transmitting radio-frequency signals to the fifth to eighth antenna arrays, and a feeding device, for alternatively outputting radio-frequency signals to the first complex antenna and the second complex antenna via the first and second transmission line devices, and switching phases of the radio-frequency signals outputted to the first to eighth antenna arrays.

8 Claims, 14 Drawing Sheets

ANTENNA SYSTEM

BACKGROUND OF THE INVENTION

1. Field of the Invention

The present invention relates to an antenna system, and more particularly, to an antenna system with adaptive beam alignment capability, high antenna gain value and beam coverage rate, low cost and small volume.

2. Description of the Prior Art

An electronic product with wireless communication functions emits or receives radio waves via an antenna to transmit or transfer wireless signals to access a wireless network. With the advance of wireless communication technology, the demand for transmission capacity and wireless network performance also rises. Therefore, many wireless communication systems have supported Multi-input Multi-output (MIMO) communication technology, which can greatly increase the data throughput and transmission distance of the system without increasing the bandwidth or total transmit power expenditure, so as to effectively enhance the spectrum efficiency and transmission rate of the wireless communication system and improve communication quality.

There are many types of antennas that support MIMO communication technology. A panel-type antenna has a less complex structure and is rather inexpensive. However, the beamwidth of the panel-type antenna in the horizontal plane is narrow, meaning that the beam coverage rate is low, such that it is hard to mount the panel-type antenna precisely. Moreover, the panel-type antenna lacks adaptive beam alignment capabilities. If a driving motor is applied to align the panel-type antenna in the direction with the best signal receiving quality, the drawbacks of the panel-type antenna may be compensated. However, adding the driving motor increases the manufacturing cost, involves restrictions on the installation, and is unable to meet the trend for compact electronic products. Although a complex antenna of cylindrical radome requires no driving motor, it has a larger volume and lower antenna gain value.

Therefore, how to increase the antenna gain value and the beam coverage rate under the limited volume and cost while taking adaptive beam alignment capability into account has become a goal in the industry.

SUMMARY OF THE INVENTION

Therefore, the present application primarily provides an antenna system with adaptive beam alignment capability, high antenna gain value and beam coverage rate, low cost and smaller size.

An antenna system for receiving and transmitting wireless signals includes a first complex antenna, a second complex antenna, and a feeding device. The first complex antenna includes a first dielectric layer; a first metal grounding sheet, fixed to the first dielectric layer, and spaced apart from the first dielectric layer by a first gap to form a first air dielectric layer; a first, a second, a third and a fourth antenna arrays, arranged in a 4×4 array manner, fixed to the first metal grounding sheet, and spaced apart from the first metal grounding sheet by a second gap to form a second air dielectric layer; and a first transmission line device, formed on a side of the first dielectric layer facing the first metal grounding sheet, for transmitting radio-frequency signals to the first to fourth antenna arrays. The second complex antenna fixed with respect to the first complex antenna at an included angle includes a second dielectric layer; a second metal grounding sheet, fixed to the second dielectric layer, and spaced apart from the second dielectric layer by a third gap to form a third air dielectric layer; a fifth, a sixth, a seventh and an eighth antenna arrays, arranged in the 4×4 array manner, fixed to the second metal grounding sheet, and spaced apart from the second metal grounding sheet by a fourth gap to form a fourth air dielectric layer; and a second transmission line device, formed on a side of the second dielectric layer facing the second metal grounding sheet, for transmitting radio-frequency signals to the fifth to eighth antenna arrays. The feeding device, coupled between the first transmission line device and the second transmission line device, wherein the feeding device is configured for alternately outputting radio-frequency signals to the first complex antenna and the second complex antenna so as to emit wireless signals via the first complex antenna and the second complex antenna, and for switching phases of radio-frequency signals outputted to the first to eighth antenna arrays so as to change characteristics of beam generated by the first to eighth antenna arrays.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
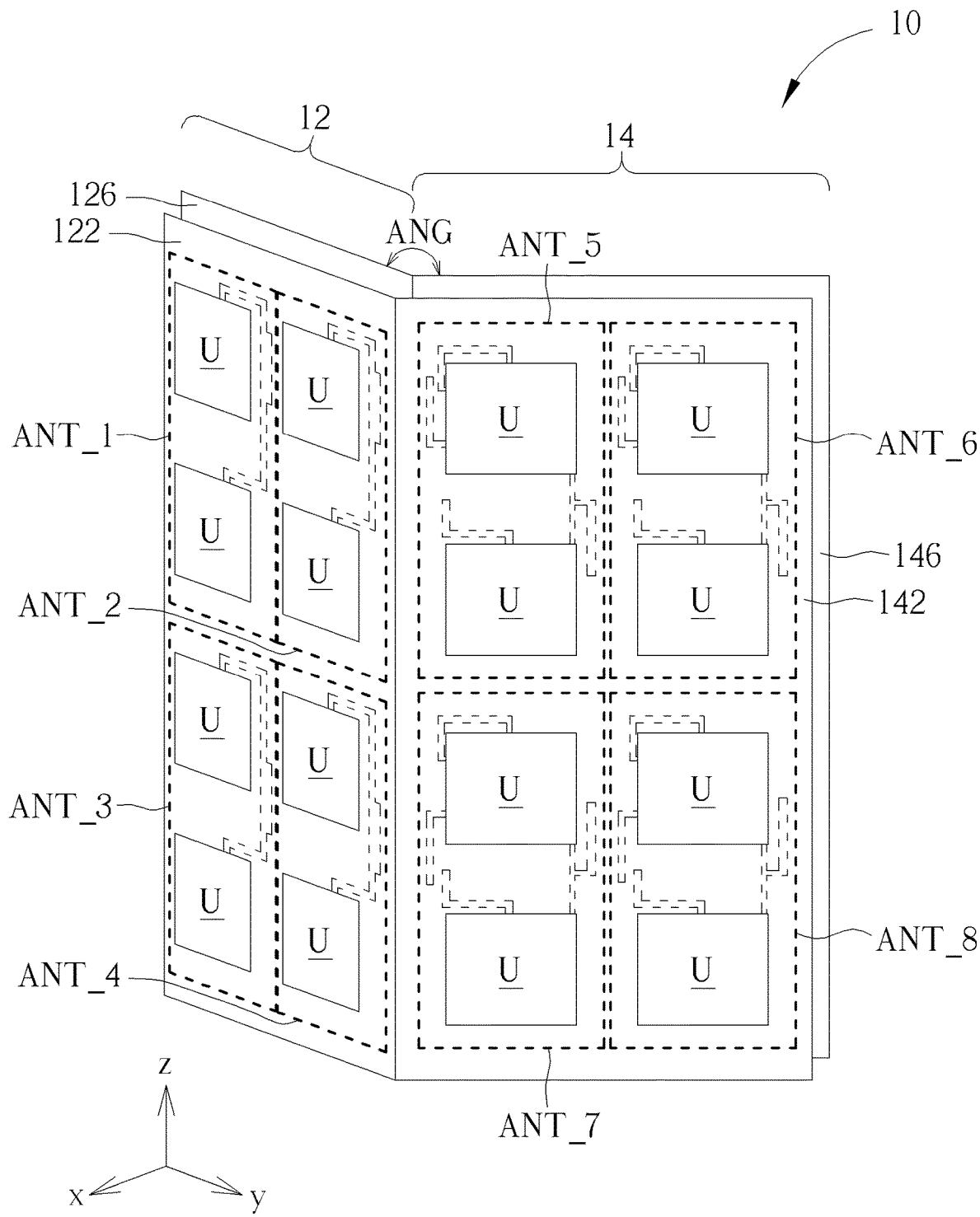
FIG. 1A is a perspective view diagram of an antenna system according to an embodiment of the present invention.
Figure 1B:
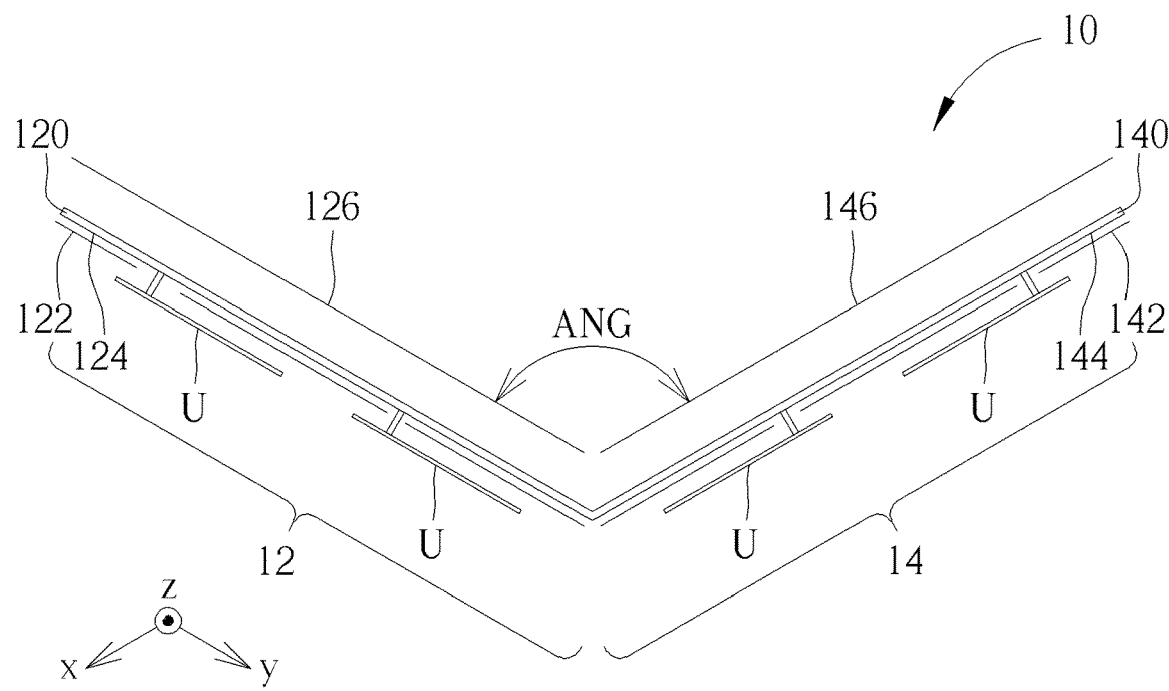
FIG. 1B is a top view diagram of the antenna system shown in FIG. 1A.
Figure 1C:
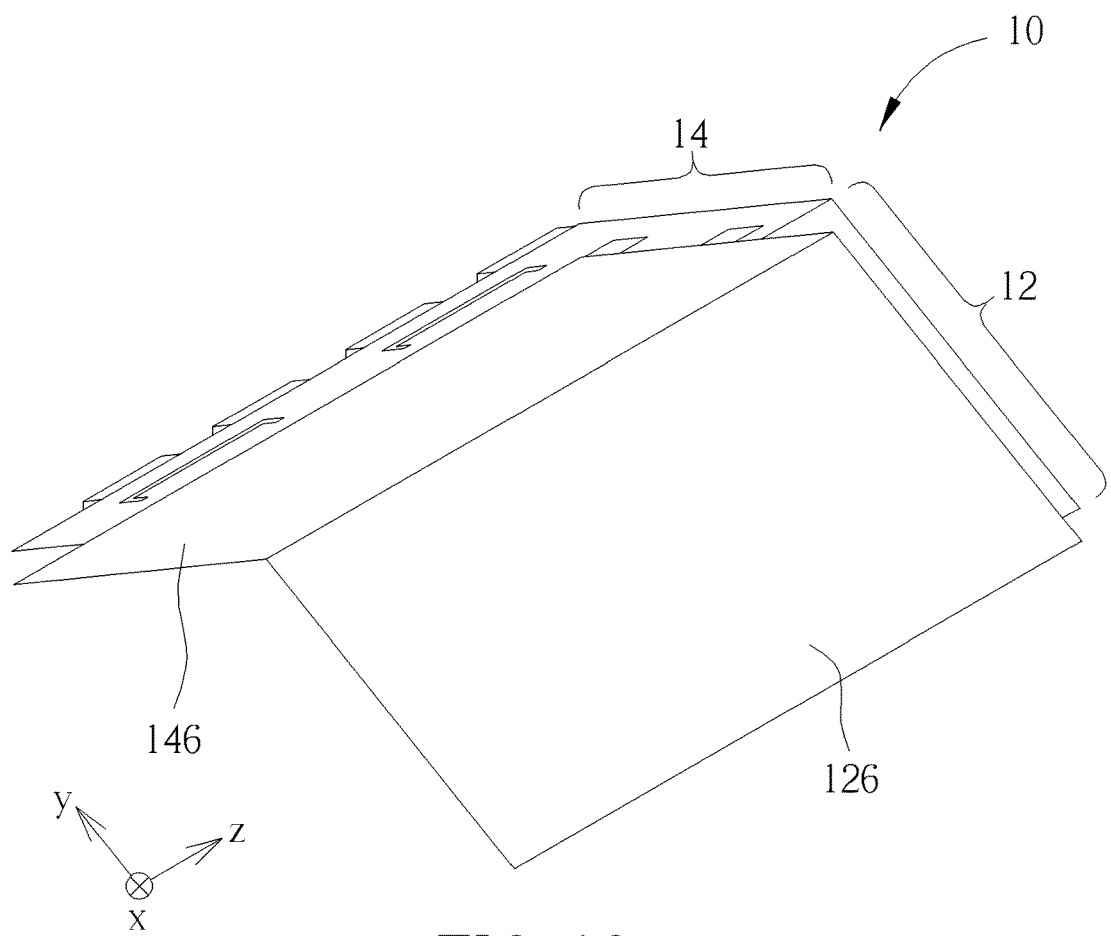
FIG. 1C is a rear side view diagram of the antenna system shown in FIG. 1A.

Please refer to FIG. 1A, FIG. 1B and FIG. 1C. FIG. 1A is a perspective view diagram of an antenna system 10 according to an embodiment of the present invention. FIG. 1B is a top view diagram of the antenna system 10. FIG. 1C is a rear side view diagram of the antenna system 10. An x-y-z coordinate system is shown in FIGS. 1A, 1B, 1C and subsequent figures to present the spatial relationship of the antenna system 10. The antenna system 10 is utilized to receive and transmit wireless signals, and is capable of providing a 4×4 MIMO function. The antenna system 10 includes a first complex antenna 12, a second complex antenna 14, and a feeding device 16 (not shown in FIGS. 1A, 1B and 1C). The first complex antenna 12 includes a dielectric layer 120, a metal grounding sheet 122, a transmission line device 124, a reflection sheet 126 and antenna arrays ANT_1 to ANT_4. The second complex antenna 14 includes a dielectric layer 140, a metal grounding sheet 142, a transmission line device 144, a reflection sheet 146 and antenna arrays ANT_5 to ANT_8. The first complex antenna 12 and the second complex antenna 14 are fixed on one side, and an included angle therebetween is ANG. In other words, the first complex antenna 12 is fixed with respect to the second complex antenna 14 at the included angle ANG. The included angle ANG is in a range of 70 degrees to 150 degrees, and is primarily related to gain value and beam coverage rate of the antenna system 10. The included angle ANG may be 120 degrees. If the included angle ANG increases, the gain value may increase but the beam coverage rate may decrease. Conversely, if the included angle ANG is reduced, the gain value decrease but the beam coverage rate may be improved. Each of the antenna arrays ANT_1 to ANT_8 is a 1×2 antenna array. Namely, each of the antenna arrays ANT_1 to ANT_8 includes two unit antennas U arranged vertically (for example, from top to bottom, or from bottom to top), and the two unit antennas U have identical structures and sizes.

Figure 2A:
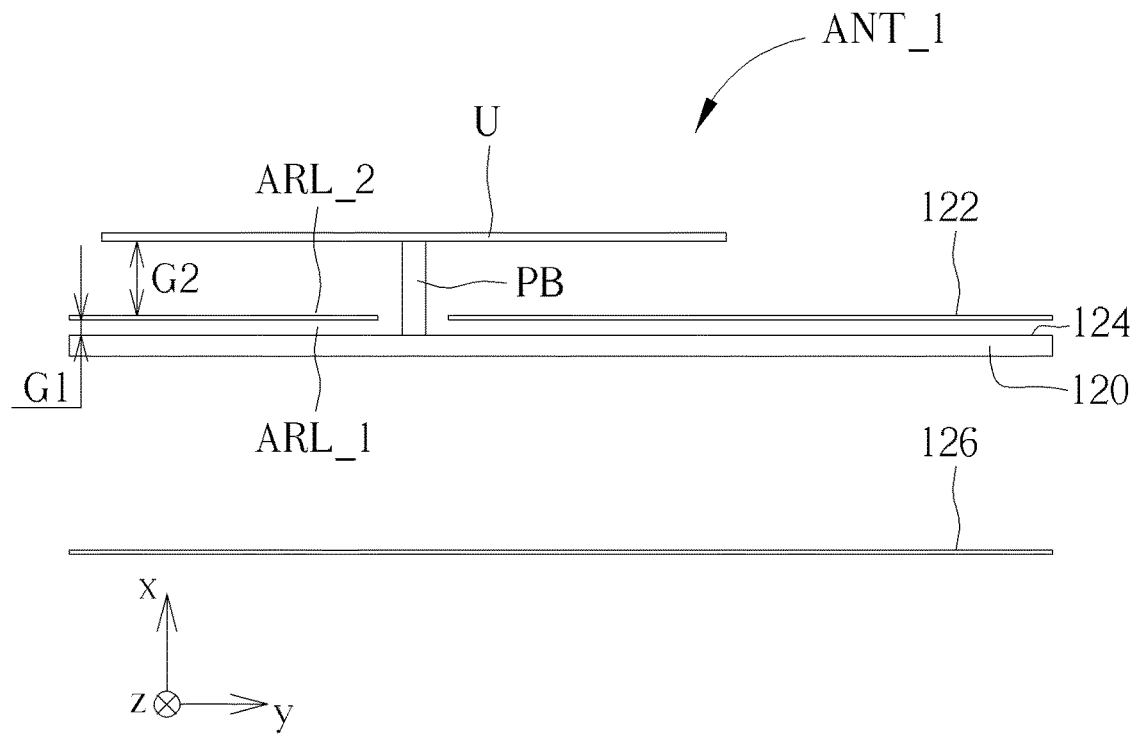
FIG. 2A is a cross-section view diagram of the antenna array shown in FIG. 1A.
Figure 2B:
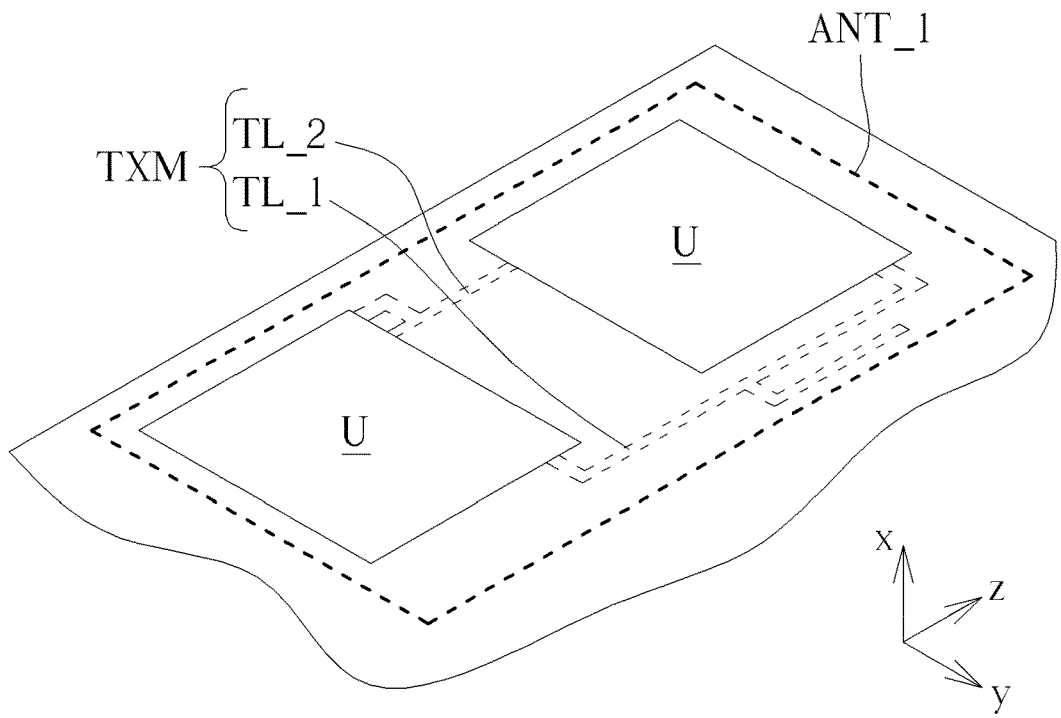
FIG. 2B is a schematic diagram of the antenna array shown in FIG. 1A in appearance.
Figure 2C:
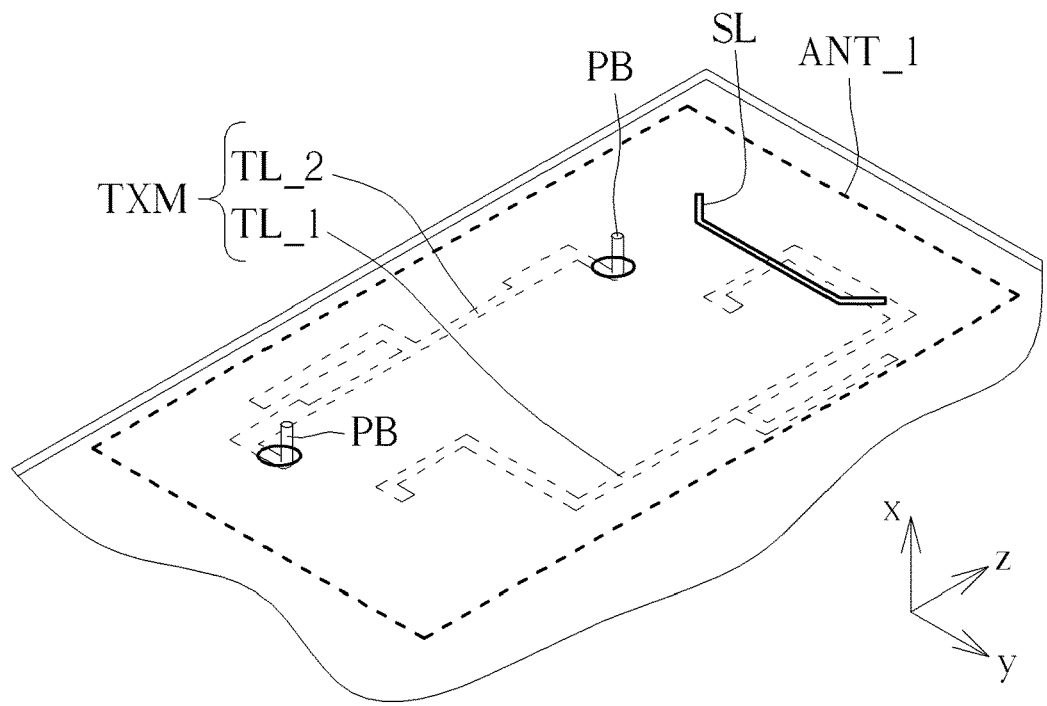
FIG. 2C is a diagram of the antenna array shown in FIG. 1A without a unit antennas.
Figure 2D:
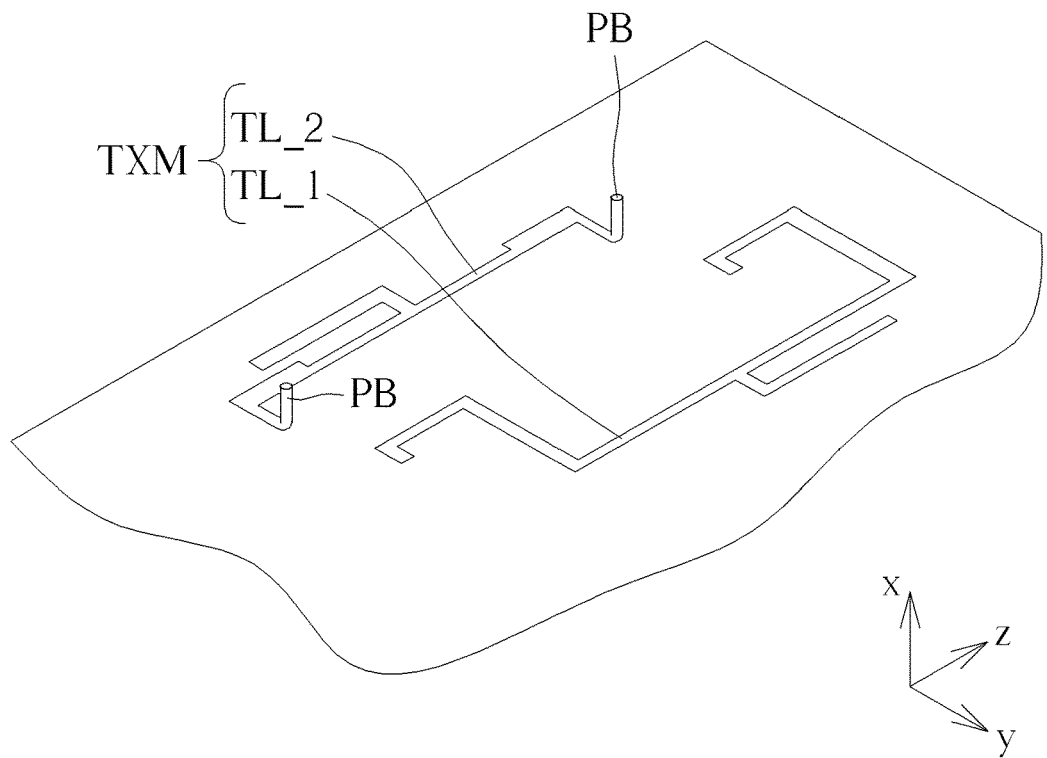
FIG. 2D is a diagram of the antenna array shown in FIG. 1A without a unit antennas and a metal grounding sheet.
Figure 3A:
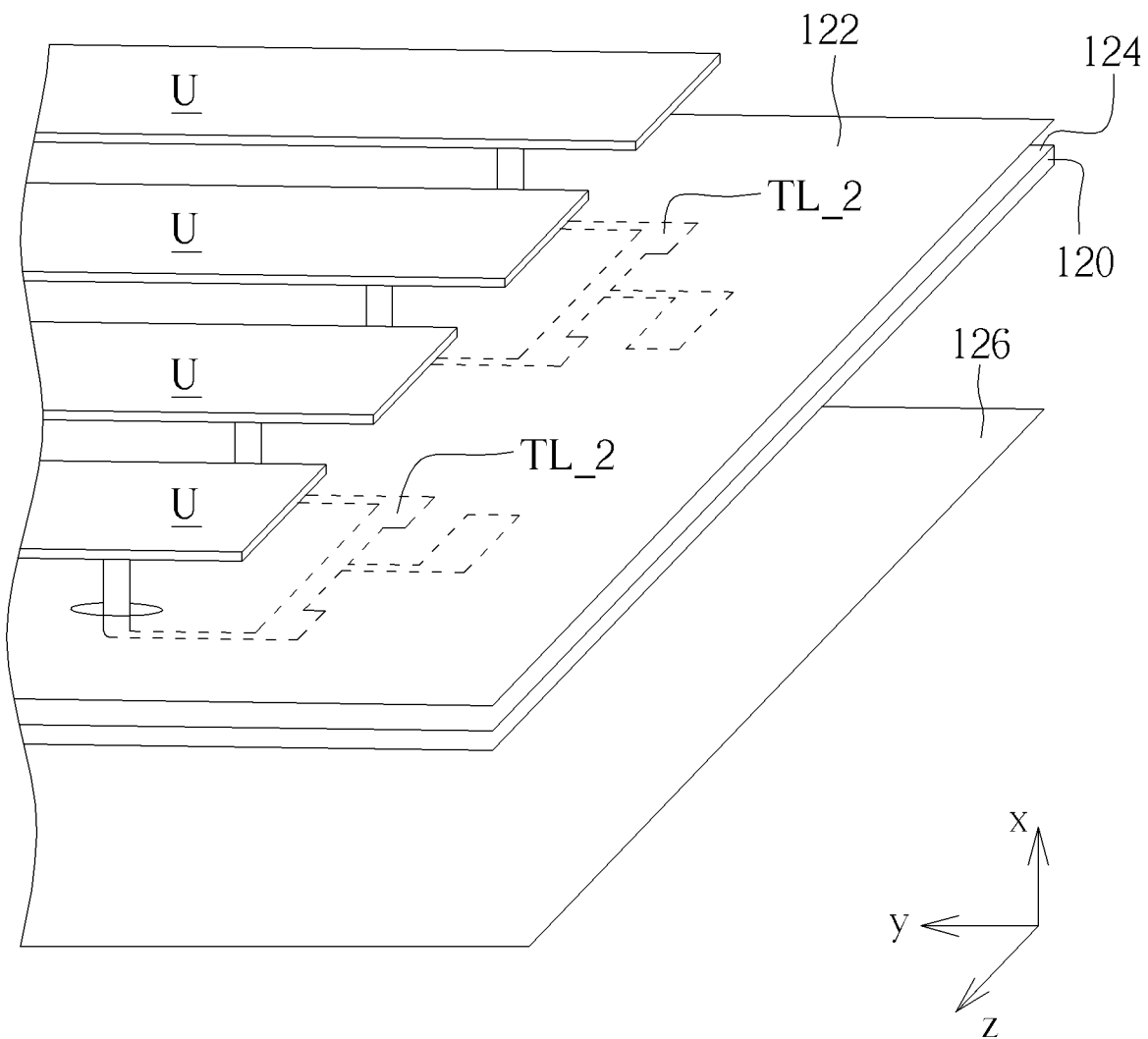
FIGS. 3A and 3B are schematic diagrams illustrating locally enlarged views from different angles of a first complex antenna shown in FIG. 1A.
Figure 3B:
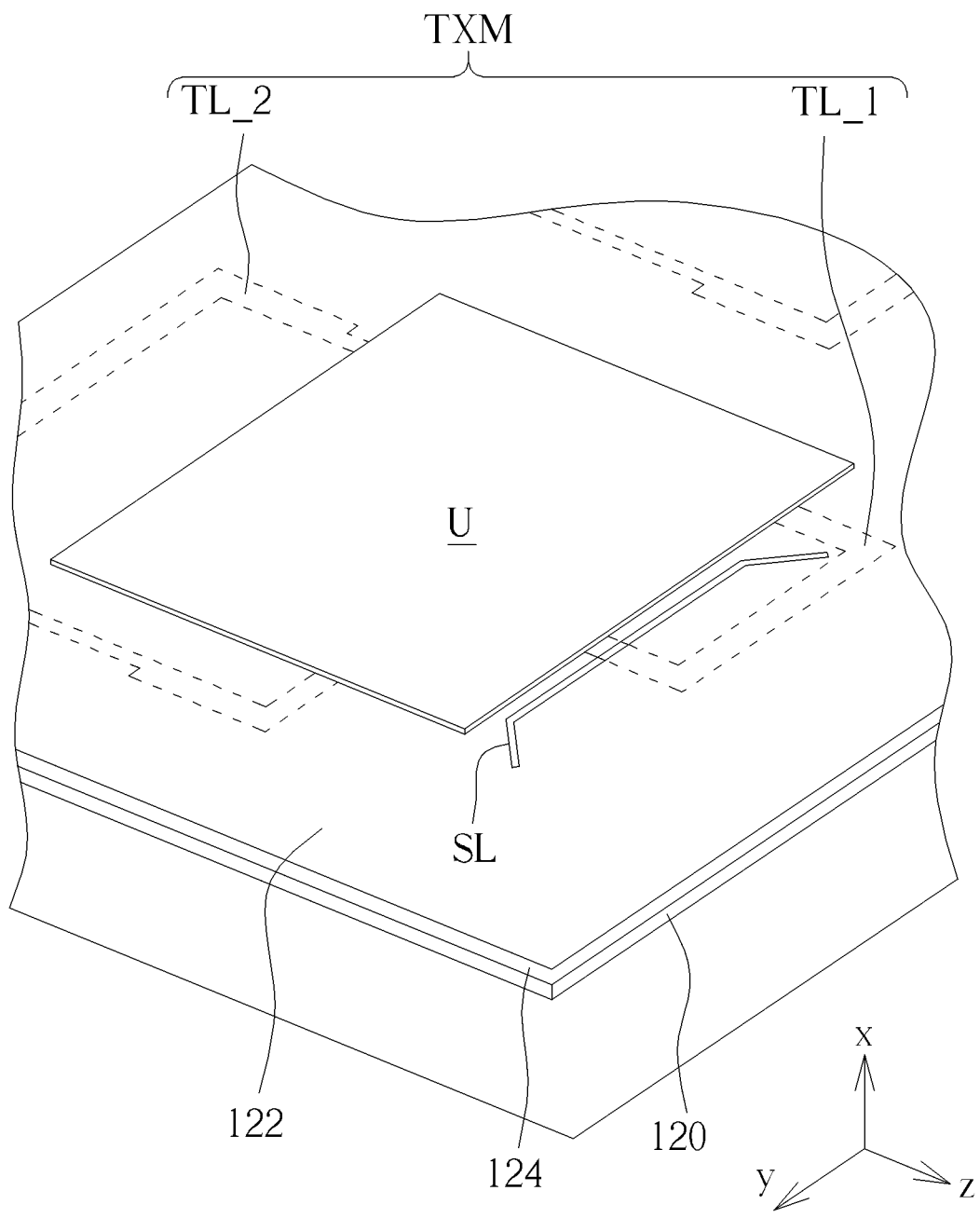

The structure of the first complex antenna 12 is similar to that of the second complex antenna 14, wherein the reflection sheets 126, 146, the dielectric layers 120, 140, the transmission line devices 124, 144, the metal grounding sheets 122, 142 and the antenna arrays ANT_1 to ANT_8 are sequentially arranged from bottom to top (from back surface to top surface). The antenna arrays ANT_1 to ANT_8 are arranged in a 4×4 array manner (i.e., a 4 by 4 array having 4 rows and 4 columns) and are fixed to the metal grounding sheets 122, 142. The detailed structures of the first complex antenna 12 and the second complex antenna 14 are described as follows by taking the antenna array ANT_1 of the first complex antenna 12 as an example. Please refer to FIGS. 2A to 2D. FIG. 2A is a cross-section view diagram of the antenna array ANT_1. FIG. 2B is a schematic diagram of the antenna array ANT_1 in appearance. FIG. 2C is a diagram of the antenna array ANT_1 without the unit antennas U. FIG. 2D is a diagram of the antenna array ANT_1 without the unit antennas U and the metal grounding sheet 122. In the antenna system 10, each of the unit antennas U is a dual-polarized microstrip antenna; that is to say, it is able to generate vertically polarized radiation pattern and horizontally polarized radiation pattern. In this case, a composite feeding approach (that is, direct feeding and coupling feeding are used to transmit radio-frequency signals to the unit antennas U) is adopted to ensure reliable operation of the unit antenna U. As shown in FIGS. 2A to 2D, the transmission line device 124 is formed on/above the dielectric layer 120. Although FIGS. 2B to 2D merely show a transmission line module TXM corresponding to the antenna array ANT_1, the transmission line device 124 includes four transmission line modules TXM, which correspond to the antenna arrays ANT_1 to ANT_4 respectively. Each of the transmission line modules TXM is constituted by transmission lines TL_1, TL_2. Each of the transmission line modules TXM is electrically connected to the feeding device 16 (not shown in FIGS. 2A to 2D), and is configured to feed radio-frequency signals to the unit antenna U. The transmission line TL_1 corresponds to vertically polarized operation. Instead of electrically connected to the unit antenna U, the transmission line TL_1 together with a slot SL of the metal grounding sheet 122 (as shown in FIG. 2C) transmit radio-frequency signals to the unit antenna U by means of coupling feeding. The transmission line TL_2 corresponds to horizontally polarized operation. The transmission line TL_2 has a feeding element PB electrically connected to the unit antenna U (as shown in FIGS. 2A, 2C, and 2D) in order to transmit radio-frequency signals to the unit antenna U by means of direct feeding. The metal grounding sheet 122 further includes a slot corresponding to the feeding element PB. The feeding element PB penetrates the metal grounding sheet 122 by passing through the slot. In addition, as shown in FIG. 2A, the metal grounding sheets 122 is spaced apart from the dielectric layer 120 by a gap G1 to form an air dielectric layer ARL_1, which aims to reduce energy loss of transmission line. The metal grounding sheets 122 is spaced apart from the unit antenna U by a gap G2 to form an air dielectric layer ARL_2, which also aims to reduce energy loss of transmission line. Furthermore, please refer to FIGS. 3A and 3B. FIGS. 3A and 3B are schematic diagrams illustrating locally enlarged views from different angles of the first complex antenna 12, whereby the relative relationship of the components may be clarified.

Figure 4:
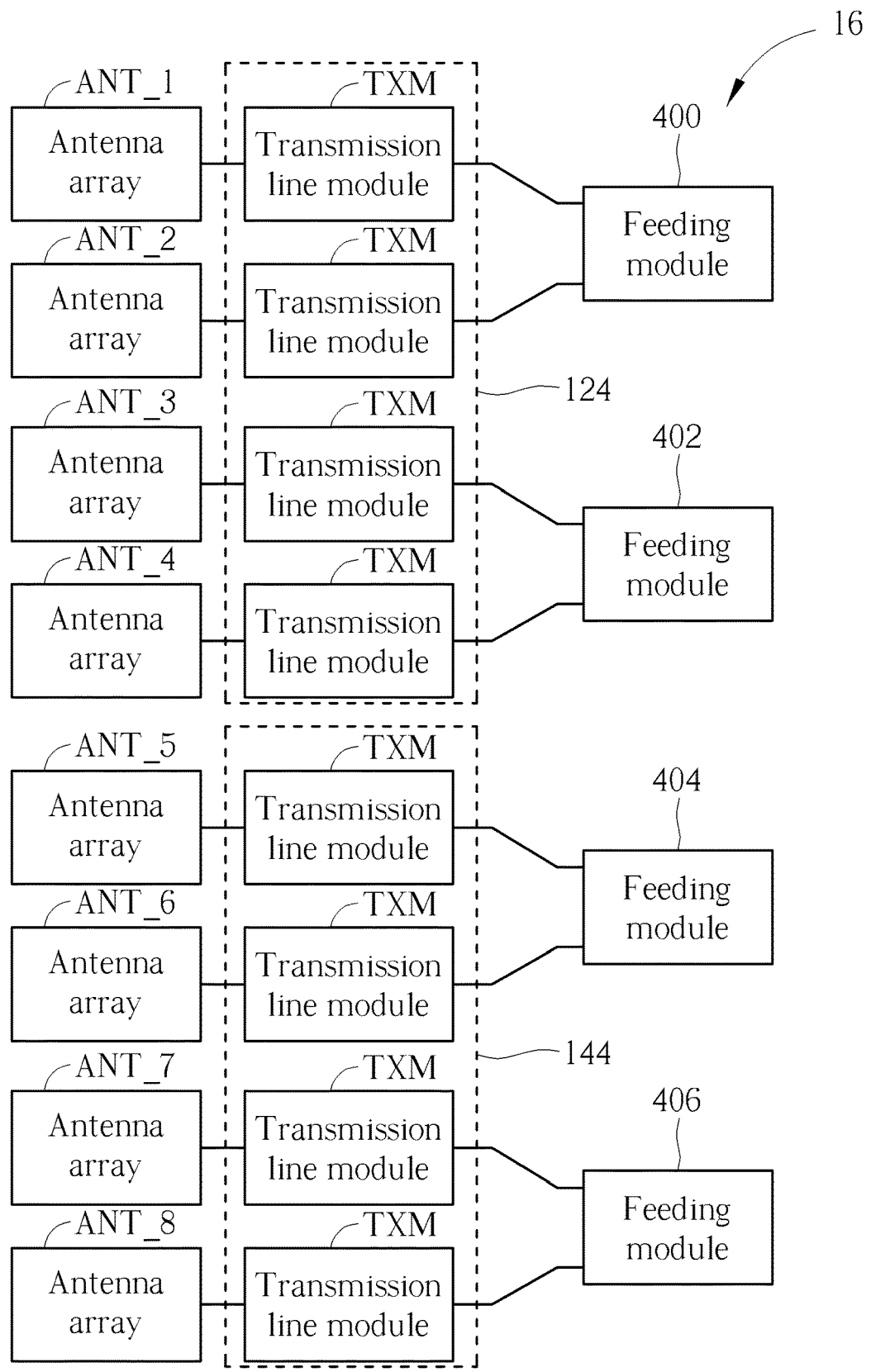
FIG. 4 is a functional block diagram of a feeding device in the antenna system shown in FIG. 1A.

Next, please refer to FIG. 4, which is a functional block diagram of the feeding device 16 in the antenna system 10.

The feeding device 16, which is electrically connected to the transmission line devices 124 and 144, is able to alternately output radio-frequency signals to the first complex antenna 12 and the second complex antenna 14 via the transmission line devices 124 and 144. The feeding device 16 is able to have only one complex antenna being turned on and the other complex antenna being turned off at a time. Furthermore, the four antenna arrays in the same complex antenna are turned on simultaneously or turned off simultaneously. Because the unit antenna U is a dual-polarized antenna, and because of mechanism of the feeding device 16, the antenna system 10 is able to provide 4×4 MIMO functions. Besides, the feeding device 16 is able to switch phases of radio-frequency signals outputted to the antenna arrays ANT_1 to ANT_8 so as to change characteristics of beam generated by the antenna arrays ANT_1 to ANT_8, thereby increasing beam coverage on the horizontal plane (i.e., the x-y plane).

Specifically, the feeding device 16 includes feeding modules 400, 402, 404, and 406. Each of the feeding modules 400, 402, 404, 406 corresponds to two horizontally adjacent antenna arrays of the antenna arrays ANT_1 to ANT_8. That is to say, the feeding module 400 outputs radio-frequency signals to the antenna arrays ANT_1 and ANT_2, which are horizontally adjacent to each other, via (two transmission line modules TXM of) the transmission line device 124. The feeding module 402 outputs radio-frequency signals to the antenna arrays ANT_3 and ANT_4, which are horizontally adjacent to each other, via (two transmission line modules TXM of) the transmission line device 124. The feeding module 404 outputs radio-frequency signals to the antenna arrays ANT_5 and ANT_6, which are horizontally adjacent to each other, via (two transmission line modules TXM of) the transmission line device 144. The feeding module 406 outputs radio-frequency signals to the antenna arrays ANT_7 and ANT_8, which are horizontally adjacent to each other, via (two transmission line modules TXM of) the transmission line device 144. In this case, the horizontally adjacent antenna arrays ANT_1, ANT_2 may form a first group of beamforming, the horizontally adjacent antenna arrays ANT_3, ANT_4 may form a second group of beamforming, the horizontally adjacent antenna arrays ANT_5, ANT_6 may form a third group of beamforming, and horizontally adjacent antenna arrays ANT_7, ANT_8 may form a fourth group of beamforming, thereby increasing beam coverage. Moreover, the feeding modules 400, 402, 404, 406 is able to switch phases of radio-frequency signals outputted to the antenna arrays ANT_1 to ANT_8 so as to change characteristics of beam generated by the antenna arrays ANT_1 to ANT_8, thereby increasing beam coverage on the horizontal plane.

Structures of the feeding modules 400, 402, 404, and 406 are identical, and are detailed as follows by taking the feeding module 400 as an example. Please refer to FIG. 5A, which is a functional block diagram of the feeding module 400 according to an embodiment of the present invention. In this embodiment, the feeding module 400 includes a power divider (or power splitter) 500 and phase shifters 502, 504. The power divider 500 is a one-to-two power divider; in other words, the power divider 500 includes an input terminal and two output terminals. The power divider 500 receives signals of a signal source from the input terminal and distributes radio-frequency signals generated by the signal source to the two output terminals. The radio-frequency signals are transmitted to the phase shifters 502, 504, and then output to the horizontally adjacent antenna arrays ANT_1, ANT_2 via (the two transmission line modules TXM of) the transmission line device 124. To achieve only one complex antenna being turned on at a time, in an embodiment, a switch circuit may be added between the signal source and the power divider 500, and connection between the signal source and the power divider 500 is controlled by the switch circuit. However, the present invention is not limited thereto, and any manner (in which only one complex antenna is turned on at a time while the other complex antenna is turned off) may be adopted in the present invention. In addition, the signal source merely serves to illustrate output signals of a radio-frequency processing circuit, and signal sources connected to the feeding modules 400, 402, 404, 406 may be integrated into the same signal source or a plurality of signal sources. The phase shifters 502, 504 may be switched between different phase shift modes so as to switch phases of radio-frequency signals outputted to transmission line module TXM; accordingly, radio-frequency signals outputted from the power divider 500 may be transmitted to the unit antennas U in a plurality of phase states. In a phase state, there is no phase difference between radio-frequency signals outputted by the phase shifters 502, 504. In the other phase states, there may be phase difference(s) between radio-frequency signals outputted by the phase shifters 502, 504. In this way, by means of the different phase states, radio-frequency signals received by the antenna arrays ANT_1 to ANT_8 may have no phase difference or have (different) phase difference(s), and may form leftward-bent, rightward-bent, or undeflected beams in horizontal plane, thereby increasing beam coverage on the horizontal plane.

For example, suppose that the phase shifter 502 has a phase shift mode of 0 degrees and a phase shift mode of 110 degrees, and suppose that radio-frequency signals outputted from the phase shifter 502 is transmitted to the antenna array ANT_1 via the transmission line module TXM. Similarly, suppose that the phase shifter 504 has a phase shift mode of 0 degrees and a phase shift mode of 110 degrees, and suppose that radio-frequency signals outputted from the phase shifter 504 is transmitted to the antenna array ANT_2 via the transmission line module TXM. In a first phase state, both the phase shifters 502, 504 are operated in the 0 degree phase shift mode; that is to say, radio-frequency signals outputted from the phase shifters 502, 504 have no phase difference, such that radio-frequency signals received by the antenna arrays ANT_1, ANT_2 are continuous phase inputs with 0 degree difference. In a second phase state, the phase shifter 502 is operated in the 0 degree phase shift mode, and the phase shifter 504 is operated in the 110 degree phase shift mode. Therefore, radio-frequency signals received by the antenna arrays ANT_1, ANT_2 are continuous phase inputs with +110 degree difference. In a third phase state, the phase shifter 502 is operated in the 110 degree phase shift mode, and the phase shifter 504 is operated in the 0 degree phase shift mode. Therefore, radio-frequency signals received by the antenna arrays ANT_1, ANT_2 are continuous phase inputs with −110 degree difference. In other words, in the first phase state, the second phase state, and the third phase state, input phase values of the antenna arrays ANT_1, ANT_2 are respectively 0 degree difference continuous input of undeflected beam, +110 degree difference continuous input of rightward-bent beam (or rightward deflecting beam), and −110 degree difference continuous input of leftward-bent beam, such that three types of beams are formed to increase beam coverage on the horizontal plane. Therefore, as long as the phase shift modes of the phase shifter 502 are appropriately switched or adjusted, the antenna arrays ANT_1, ANT_2 may have phase inputs of different angles, thereby generating different beams to increase beam coverage on the horizontal plane.

To achieve the phase shifter 502 of two phase shift modes, in an embodiment, a combination of a switch and a delay unit may be utilized. For example, please refer to FIG. 5B, which is a schematic diagram of an embodiment of the phase shifter 502 according to an embodiment of the present invention. In this embodiment, the phase shifter 502 includes a switch 508, a delay unit 510, and an output line 512. The switch 508 is coupled to the power divider 500. The switch 508 is able to output radio-frequency signals provided by the power divider 500 to the delay unit 510 or the output line 512 according to different phase states. In this embodiment, the delay unit 510 corresponds to the 110 degree phase shift mode, and phases of radio-frequency signals may be delayed 110 degrees by the delay unit 510. The output line 512 corresponds to the 0 degree phase shift mode, meaning that phases of radio-frequency signals are unchanged. In this way, it is possible to have a phase difference of 110 degrees or 0 degrees with the switch 508, which switches the output of radio-frequency signals to either the delay unit 510 or the output line 512.

As can be seen above, there is no need for the antenna system 10 to form a cyclic or an annular structure so that the cost and the size may be decreased, the external form or appearance is close to a flat shape (or a sheet-like shape), and the antenna system 10 is suitable for hanging on a wall. In terms of antenna structure, the unit antennas U are dual-polarized microstrip antennas, and a composite feeding approach is adopted to implement the direct feeding and the coupling feeding. Accordingly, vertically polarized antenna characteristics and horizontally polarized antenna characteristics, which include resonance bandwidth and front-to-back (F/B) ratio, are effectively improved. Furthermore, any two horizontally adjacent antenna arrays of the antenna arrays ANT_1 to ANT_8 may be used together to perform beamforming so that two sets of beamforming antennas are provided in one complex antenna. The feeding device 16 turns on merely one complex antenna at a time and turns off the other complex antenna. Therefore, beam coverage of the antenna system on the horizontal plane may increase by means of beam switching, thereby achieving half-plane beam coverage and offering 4×4 MIMO functions. Besides, the feeding device 16 alters phase arrangement(s) of radio-frequency signals received by the antenna arrays ANT_1 to ANT_8 to change beam direction during/after beamforming, thereby increasing beam coverage of each complex antenna on the horizontal plane.

Figure 6:
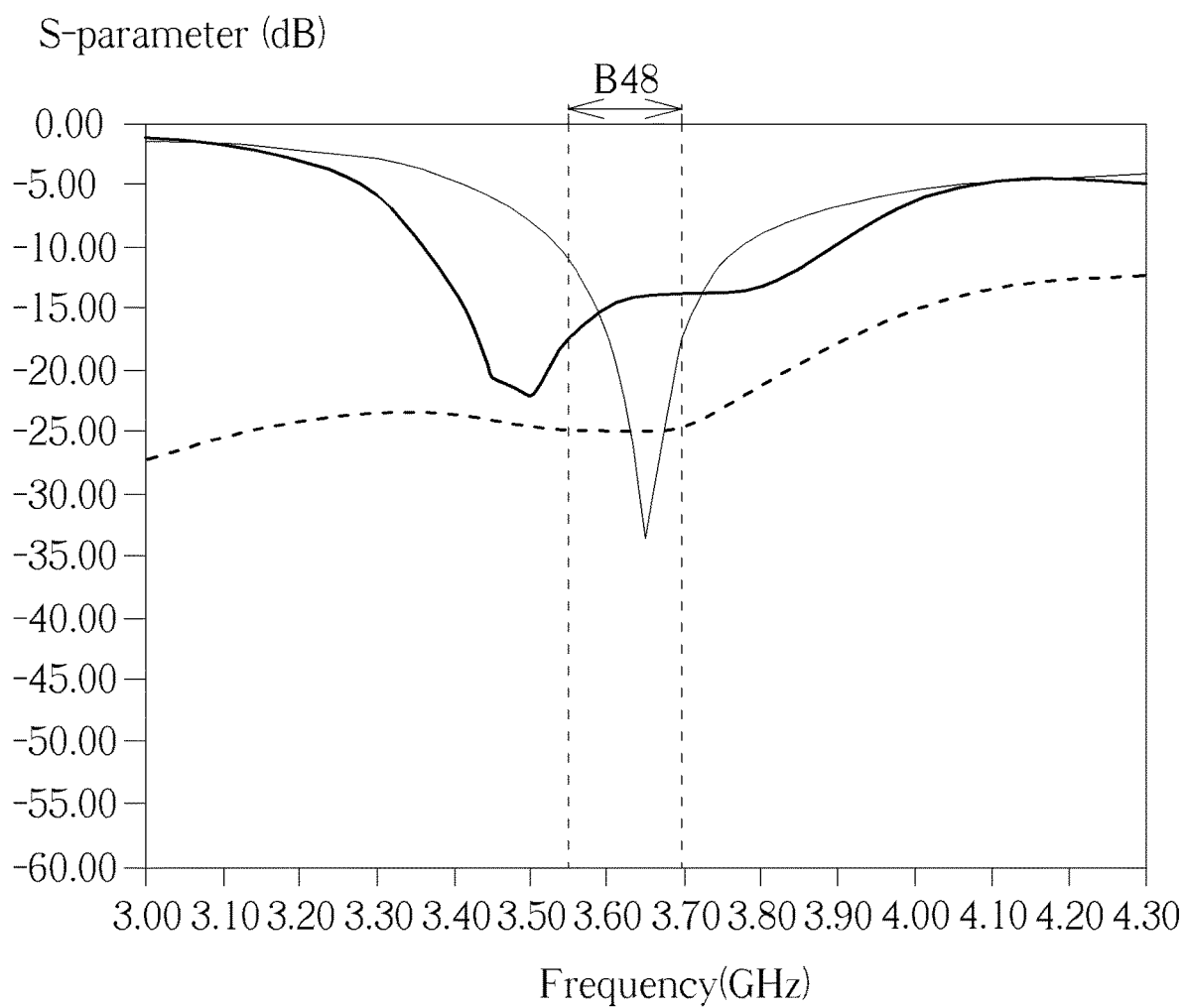
FIG. 6 is a schematic diagram of resonance characteristics and isolation of an antenna array in the antenna system shown in FIG. 1A.

In order to verify functionality of the antenna system 10, an HFSS simulation software is first applied to calculate and obtain a schematic diagram of resonance characteristics and isolation of the antenna array ANT_1 in the antenna system 10 as shown in FIG. 6, wherein the resonance characteristics (S-parameter) of the vertically and horizontally polarized antennas are presented by a thick solid curve and a thin solid curve respectively. It is shown that S11 of the antenna array ANT_1 is less than −10.9 dB and meet frequency band requirements of band48 in the LTE wireless communication system—for example, region B48 shown in FIG. 6. Meanwhile, the isolation (S-parameter) between the vertically polarized antenna and the horizontally polarized antenna inside the antenna array ANT_1 is presented by a dashed curve in FIG. 6. It is shown that the isolation between the vertically polarized antenna and the horizontally polarized antenna is greater than 24.2 dB. The other antenna arrays have similar characteristics and hence are not detailed redundantly.

Figure 7A:
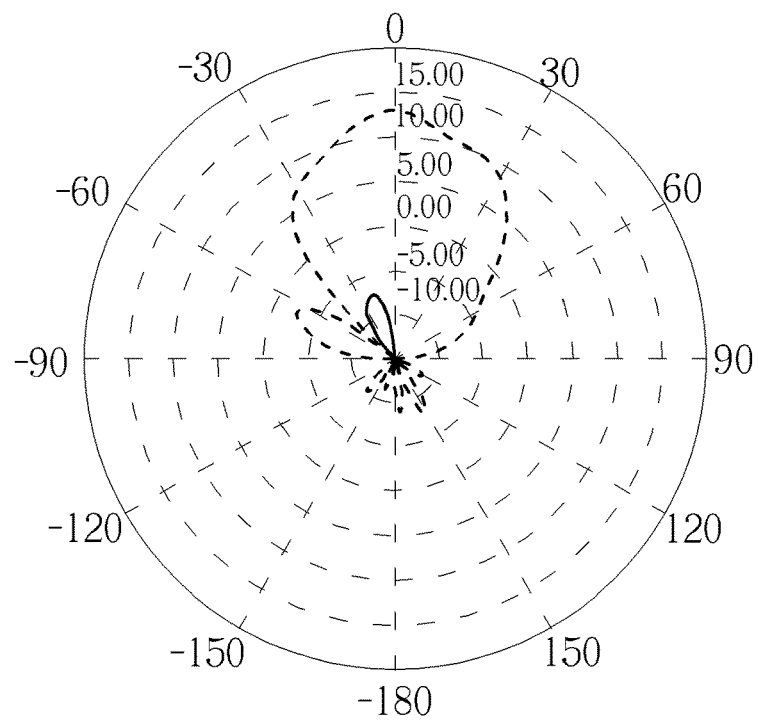
FIG. 7A is a gain value field pattern of vertically polarized antennas of two antenna arrays in the antenna system shown in FIG. 1A on the vertical plane after beam combination.
Figure 7B:
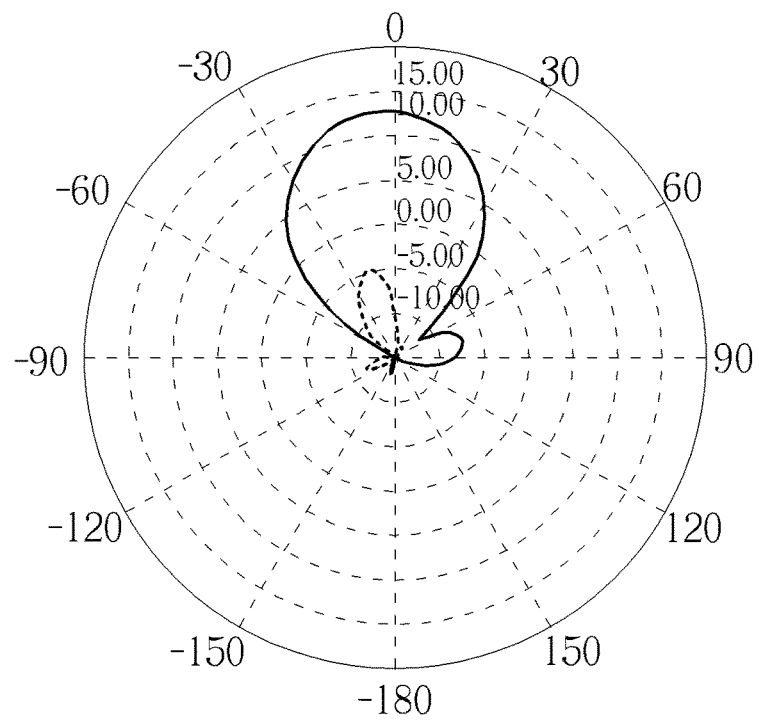
FIG. 7B is a gain value field pattern of horizontally polarized antennas of two antenna arrays in the antenna system shown in FIG. 1A on the vertical plane after beam combination.

FIG. 7A is a gain value field pattern of the vertically polarized antennas of the antenna arrays ANT_1, ANT_2 at 3550 MHz on the vertical plane (i.e., the x-z plane) after beam combination of the two vertically polarized antennas with 0 degree phase difference, wherein the gain value field patterns corresponding to different polarization directions on the vertical plane—that is, the gain value field patterns of common polarization (Co-pol) and cross polarization (Cx-pol)—are presented by a dashed curve and a solid curve respectively. It is shown that 3 dB beamwidth is substantially 41 degrees, which meets wireless communication requirements. FIG. 7B is a gain value field pattern of the horizontally polarized antennas of the antenna arrays ANT_1, ANT_2 at 3550 MHz on the vertical plane after beam combination, wherein the gain value field patterns corresponding to different polarization directions on the vertical plane—that is, the gain value field patterns of Co-pol and Cx-pol—are presented by a solid curve and a dashed curve respectively. It is shown that 3 dB beamwidth is substantially 43 degrees, which also meets wireless communication requirements. In other words, the vertically polarized antennas and the horizontally polarized antennas of the antenna arrays ANT_1, ANT_2 have sufficient beamwidth on the vertical plane after beam combination.

Figure 5A:
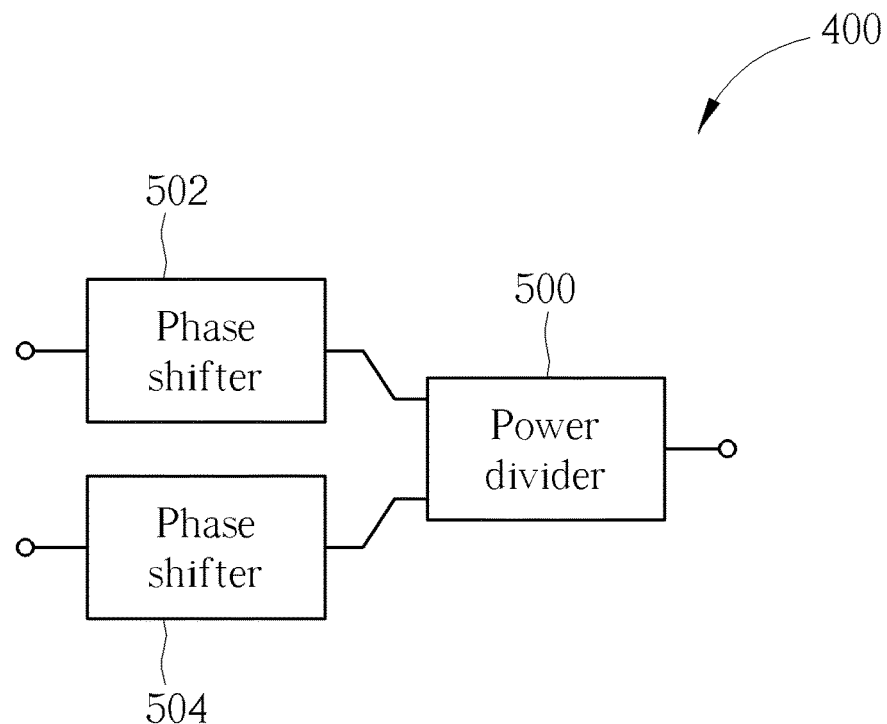
FIG. 5A is a functional block diagram of a feeding module shown in FIG. 4 according to an embodiment of the present invention.
Figure 5B:
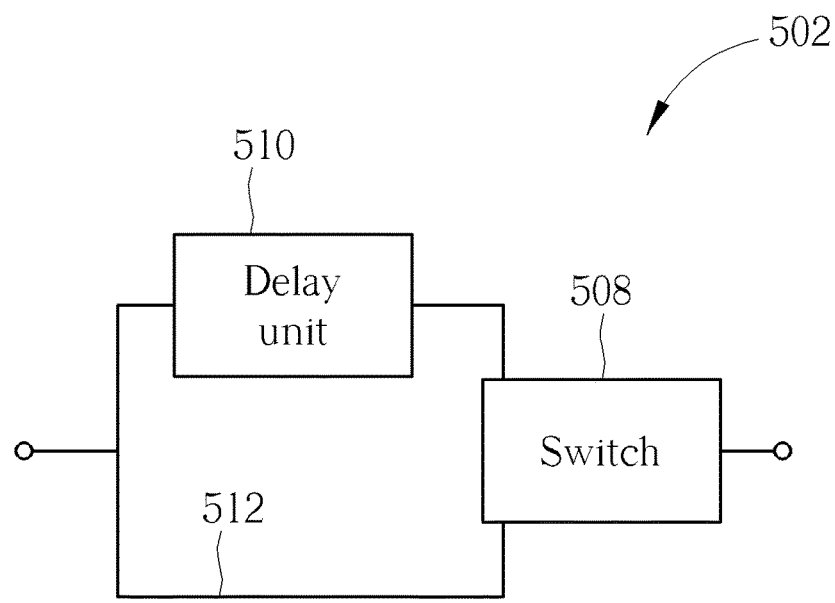
FIG. 5B is a schematic diagram of an embodiment of a phase shifter shown in FIG. 5A according to an embodiment of the present invention.
Figure 8A:
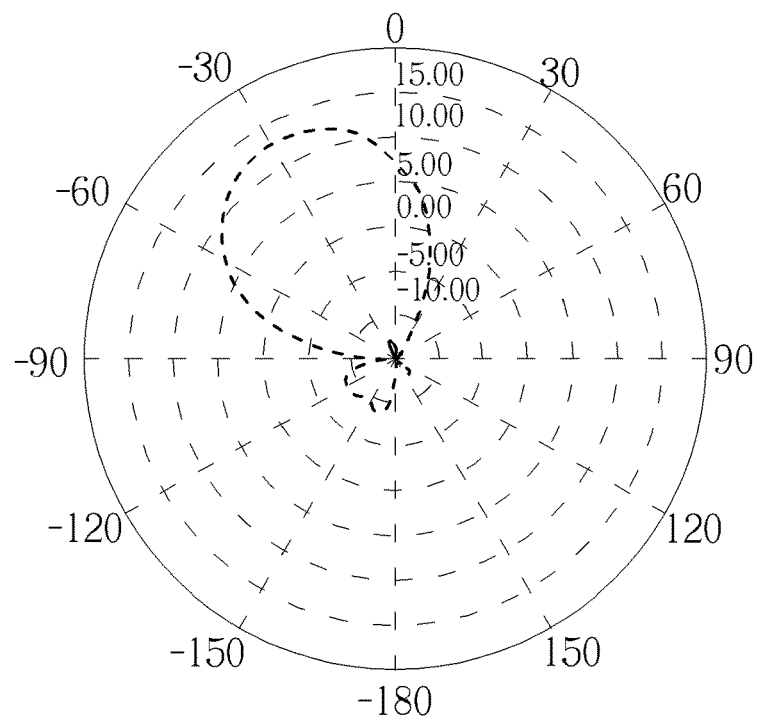
FIG. 8A is a gain value field pattern of vertically polarized antennas of two antenna arrays in the antenna system shown in FIG. 1A on the horizontal plane after beam combination when a phase difference is 0 degrees.
Figure 8B:
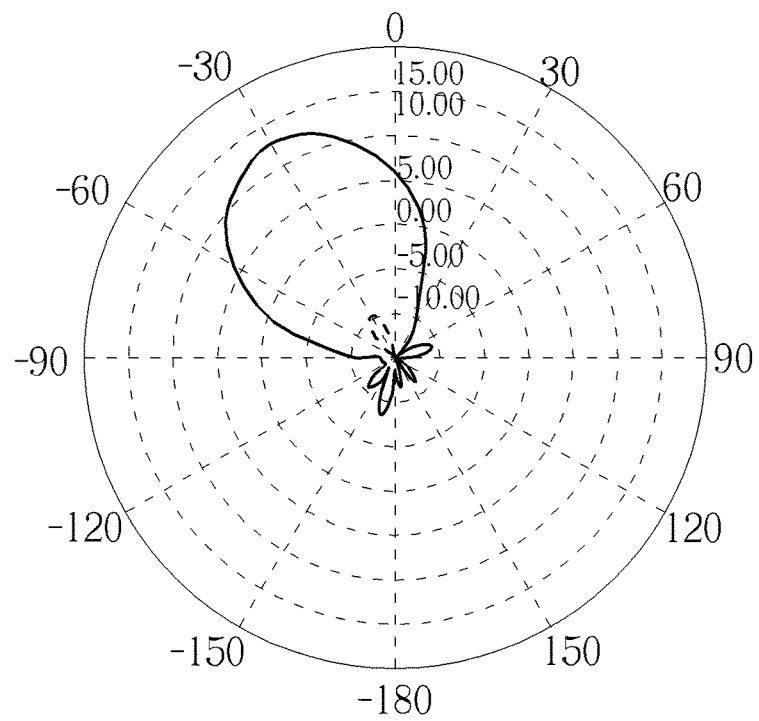
FIG. 8B is a gain value field pattern of horizontally polarized antennas of two antenna arrays in the antenna system shown in FIG. 1A on the horizontal plane after beam combination when a phase difference is 0 degrees.

As set forth above, the feeding device 16 may change the phase arrangement(s) of radio-frequency signals received by the antenna arrays ANT_1 to ANT_8, and hence leftward-bent, rightward-bent, or undeflected beams are generated on the horizontal plane, thereby forming three beams to increase beam coverage. First, when the antenna arrays ANT_1, ANT_2 are required to output an undeflected beam, the phase shifters 502, 504 in FIG. 5A are operated in the 0 degree phase shift mode, the corresponding gain value field patterns on the horizontal plane are shown in FIGS. 8A and 8B. FIG. 8A is a gain value field pattern of the vertically polarized antennas of the antenna arrays ANT_1, ANT_2 at 3550 MHz on the horizontal plane after beam combination, wherein the gain value field patterns corresponding to different polarization directions on the horizontal plane—that is, the gain value field patterns of Co-pol and Cx-pol—are presented by a dashed curve and a solid curve respectively. It is shown that 3 dB beamwidth is substantially 44 degrees. FIG. 8B is a gain value field pattern of the horizontally polarized antennas of the antenna arrays ANT_1, ANT_2 at 3550 MHz on the horizontal plane after beam combination, wherein the gain value field patterns corresponding to different polarization directions on the horizontal plane—that is, the gain value field patterns of Co-pol and Cx-pol—are presented by a solid curve and a dashed curve respectively. It is shown that 3 dB beamwidth is substantially 38 degrees. As shown in FIGS. 8A and 8B, 3 dB beamwidths of the antenna arrays ANT_1, ANT_2 are less than 60 degrees after beam combination, which fails to meet specific wireless communication requirements (for example, 120 degrees in beam coverage).

Figure 9A:
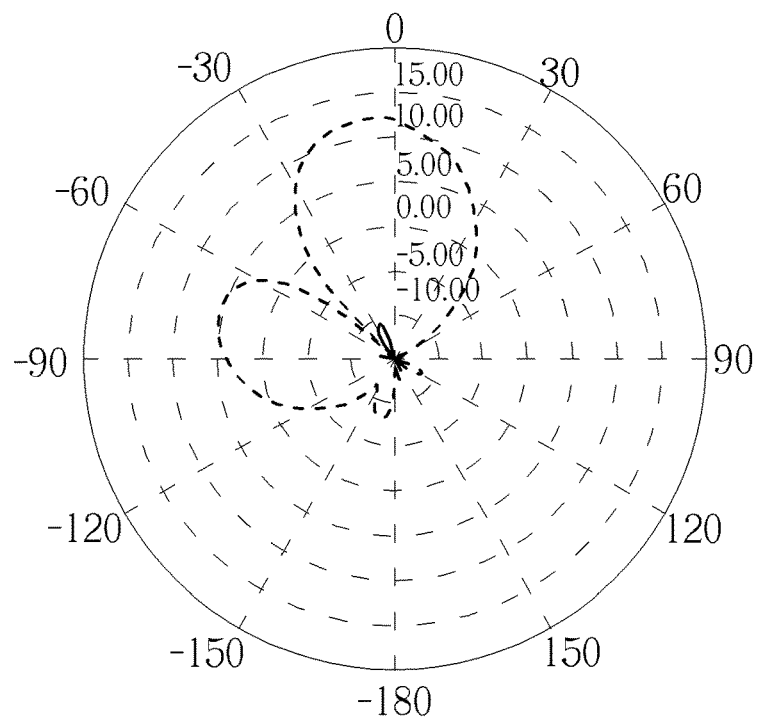
FIG. 9A is a gain value field pattern of vertically polarized antennas of two antenna arrays in the antenna system shown in FIG. 1A on the horizontal plane after beam combination when a phase difference is +110 degrees.
Figure 9B:
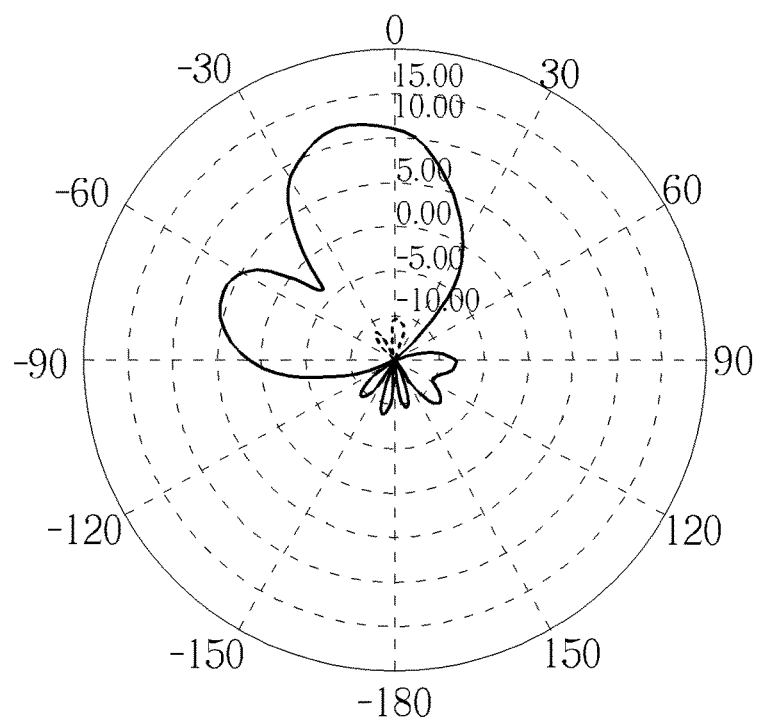
FIG. 9B is a gain value field pattern of horizontally polarized antennas of two antenna arrays in the antenna system shown in FIG. 1A on the horizontal plane after beam combination when a phase difference is +110 degrees.

Next, when the phase shifter 502 is operated in the 0 degree phase shift mode and the phase shifter 504 is operated in the 110 degree phase shift mode, radio-frequency signals received by the antenna arrays ANT_1, ANT_2 are continuous phase inputs with +110 degree difference, and the corresponding gain value field patterns on the horizontal plane are shown in FIGS. 9A and 9B. FIG. 9A is a gain value field pattern of the vertically polarized antennas of the antenna arrays ANT_1, ANT_2 at 3550 MHz on the horizontal plane after beam combination, wherein the gain value field patterns corresponding to different polarization directions on the horizontal plane—that is, the gain value field patterns of Co-pol and Cx-pol—are presented by a dashed curve and a solid curve respectively. FIG. 9B is a gain value field pattern of the horizontally polarized antennas of the antenna arrays ANT_1, ANT_2 at 3550 MHz on the horizontal plane after beam combination, wherein the gain value field patterns corresponding to different polarization directions on the horizontal plane—that is, the gain value field patterns of Co-pol and Cx-pol—are presented by a solid curve and a dashed curve respectively. As shown in FIGS. 9A and 9B, when the phase shifter 502 is operated in the 0 degree phase shift mode and the phase shifter 504 is operated in the 110 degree phase shift mode, field patterns deflected to the right may be formed on the horizontal plane after beam combination of the antenna arrays ANT_1, ANT_2.

Figure 10A:
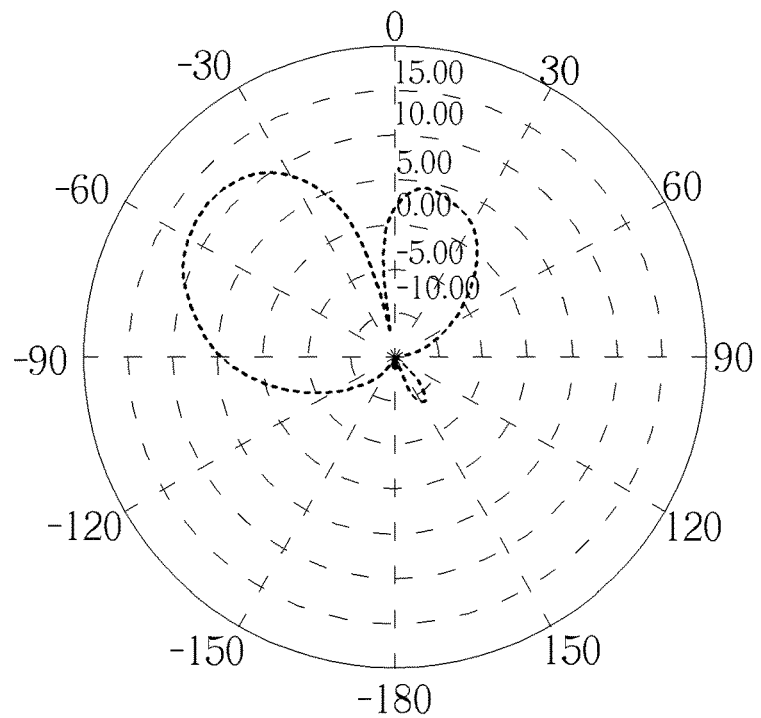
FIG. 10A is a gain value field pattern of vertically polarized antennas of two antenna arrays in the antenna system shown in FIG. 1A on the horizontal plane after beam combination when a phase difference is −110 degrees.
Figure 10B:
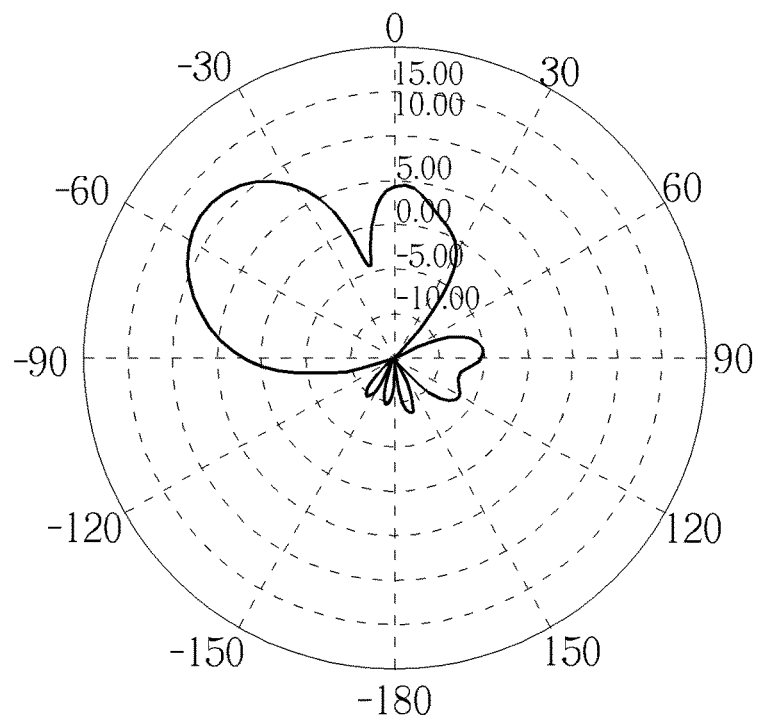
FIG. 10B is a gain value field pattern of horizontally polarized antennas of two antenna arrays in the antenna system shown in FIG. 1A on the horizontal plane after beam combination when a phase difference is −110 degrees.

Finally, when the phase shifter 502 is operated in the 110 degree phase shift mode and the phase shifter 504 is operated in the 0 degree phase shift mode, radio-frequency signals received by the antenna arrays ANT_1, ANT_2 are continuous phase inputs with −110 degree difference, and the corresponding gain value field patterns on the horizontal plane are shown in FIGS. 10A and 10B. FIG. 10A is a gain value field pattern of the vertically polarized antennas of the antenna arrays ANT_1, ANT_2 at 3550 MHz on the horizontal plane after beam combination, wherein the gain value field patterns corresponding to different polarization directions on the horizontal plane—that is, the gain value field patterns of Co-pol and Cx-pol—are presented by a dashed curve and a solid curve respectively. FIG. 10B is a gain value field pattern of the horizontally polarized antennas of the antenna arrays ANT_1, ANT_2 at 3550 MHz on the horizontal plane after beam combination, wherein the gain value field patterns corresponding to different polarization directions on the horizontal plane—that is, the gain value field patterns of Co-pol and Cx-pol—are presented by a solid curve and a dashed curve respectively. As shown in FIGS. 10A and 10B, when the phase shifter 502 is operated in the 110 degree phase shift mode and the phase shifter 504 is operated in the 0 degree phase shift mode, field patterns deflected to the left may be formed on the horizontal plane after beam combination of the antenna arrays ANT_1, ANT_2.

Figure 11A:
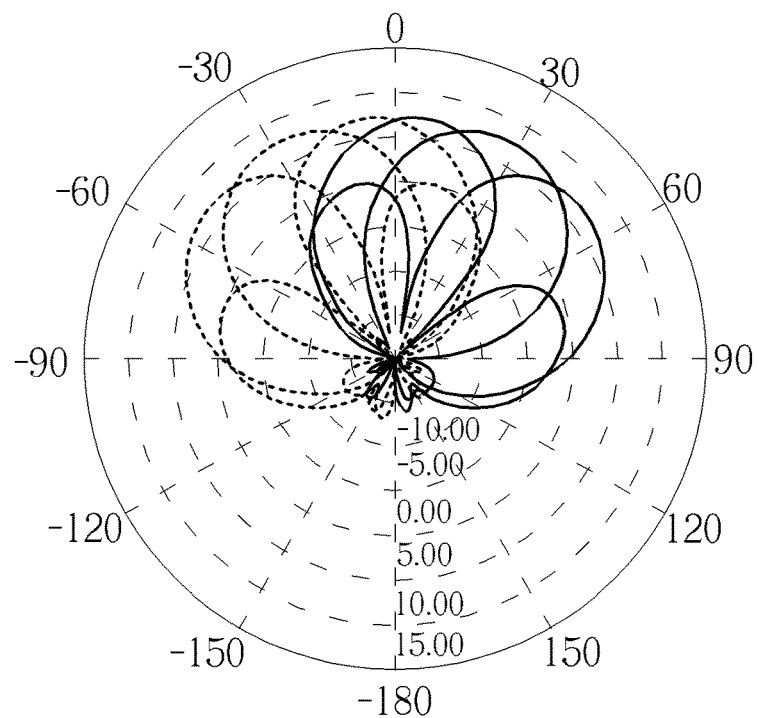
FIG. 11A is a beam coverage diagram of vertically polarized antennas of two antenna arrays in the antenna system shown in FIG. 1A on the horizontal plane.
Figure 11B:
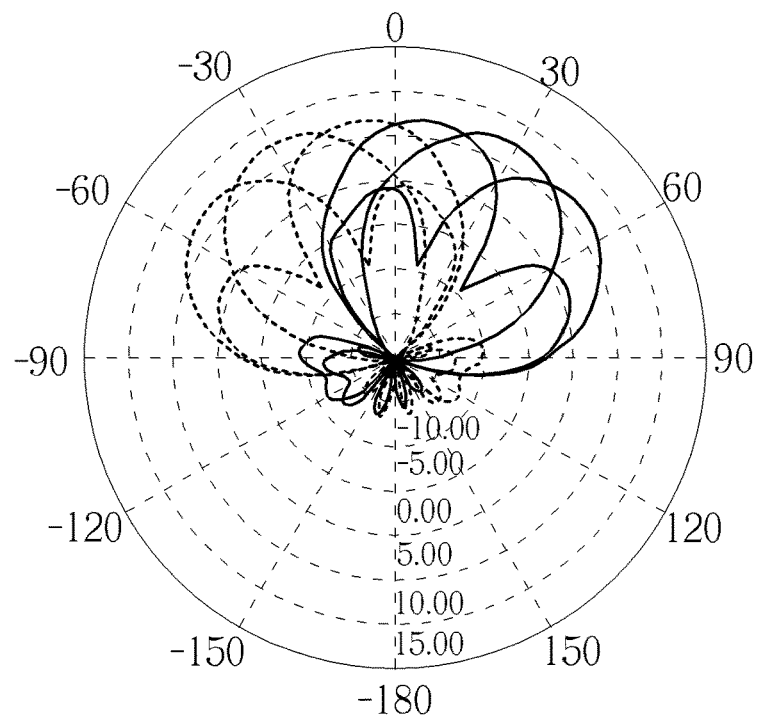
FIG. 11B is a beam coverage diagram of horizontally polarized antennas of two antenna arrays in the antenna system shown in FIG. 1A on the horizontal plane.

According to FIGS. 8A to 10B, by adjusting the phase shift modes of the phase shifters 502 and 504, three types of beams may be formed on the horizontal plane after beam combination of the antenna arrays ANT_1, ANT_2, and may be combined/merged into field pattern beam coverage as shown in FIGS. 11A and 11B. FIG. 11A is a beam coverage diagram of the vertically polarized antennas of the antenna arrays ANT_1, ANT_2 of the first complex antenna 12 and the vertically polarized antennas of the antenna arrays ANT_5, ANT_6 of the second complex antenna 14 on the horizontal plane. Within beam coverage of 120 degrees, antenna gain value is substantially in a range of 11.6 to 12.8 dBi, and its maximum value is close to 13 dBi. FIG. 11B is a beam coverage diagram of the horizontally polarized antennas of the antenna arrays ANT_1, ANT_2 of the first complex antenna 12 and the horizontally polarized antennas of the antenna arrays ANT_5, ANT_6 of the second complex antenna 14 on the horizontal plane. Within beam coverage of 120 degrees, antenna gain value is substantially in a range of 11.2 to 12.7 dBi, and its maximum value is close to 13 dBi as well. Consequently, with the feeding device 16, the antenna system 10 attains half-plane beam covered (or half-plane beam coverage), the beam coverage is at least 120 degrees, and antenna gain value is ensured.

The antenna system 10 is an exemplary embodiment of the present invention, and those skilled in the art may readily make different alternations and modifications. For example, the first complex antenna 12 and the second complex antenna 14 of the antenna system 10 may be mutually fixed because they are connected on one side; alternatively, a connection hinge connects the first complex antenna 12 and the second complex antenna 14 of the antenna system 10; alternatively, the first complex antenna 12 and the second complex antenna 14 of the antenna system 10 may be secured on a base without electrical connection. In addition, the first complex antenna 12 and the second complex antenna 14 are relatively fixed according to a specific included angle ANG. Nevertheless, a dedicated mechanical design may allow the included angle ANG between the first complex antenna 12 and the second complex antenna 14 to vary within a range of tolerance to facilitate flexibility in signal transmission and reception and to ensure ease of disposition and facility of utilization, which is also within the scope of the present invention. In addition, the transmission line devices 124 and 144 are configured to transmit radio-frequency signals. Shapes, positions, extension lengths, and so on of the transmission lines TL_1 and TL_2 may be appropriately adjusted. Feeding approaches are not limited to the combination of direct feeding and coupling feeding. As long as antenna performance is maintained, it may adopt either entirely direct feeding or entirely coupling feeding. The dielectric layer 120 may be FR4, a plastic substrate, and the like, but not limited thereto. The reflection sheets 126, 146 aim to reflect electromagnetic waves of back radiation so as to improve front-to-back ratio of antenna radiation pattern. Shapes, positions, materials, and so on of the reflection sheets 126, 146 may be adjusted according to system requirements in different applications; alternatively, the reflection sheets 126, 146 may be removed from the antenna system 10. The gap G1 between the grounding metal plate 122 and the dielectric layer 120 and the gap G2 between the grounding metal plate 122 and the unit antenna U are used to form the air dielectric layers ARL_1 and ARL_2 so as to reduce energy loss of transmission line. The gaps G1 and G2 may be appropriately modified according to different applications. Moreover, the feeding device 16 turns on only one complex antenna at a time to achieve 4×4 MIMO functions, and alters the beam forming method by changing phase arrangement(s). The present invention is not limited thereto, and any method which can achieve the same function is suitable for the present invention.

In summary, the antenna system of the present invention has an appearance close to a sheet-like shape, occupies smaller volume (to be compact), can effectively improve gain value, isolation and operation bandwidth, can provide 4×4 MIMO functions, and can effectively improve beam coverage in vertical plane and in horizontal plane.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna system, for receiving and transmitting wireless signals, comprising:
   a first complex antenna, comprising:
   a first dielectric layer;
   a first metal grounding sheet, fixed to the first dielectric layer, and spaced apart from the first dielectric layer by a first gap to form a first air dielectric layer;

a first, a second, a third and a fourth antenna arrays, arranged in a 4×4 array manner, fixed to the first metal grounding sheet, and spaced apart from the first metal grounding sheet by a second gap to form a second air dielectric layer; and a first transmission line device, formed on a side of the first dielectric layer facing the first metal grounding sheet, for transmitting radio-frequency signals to the first to fourth antenna arrays;

a second complex antenna, fixed with respect to the first complex antenna at an included angle, comprising:

a second dielectric layer;

a second metal grounding sheet, fixed to the second dielectric layer, and spaced apart from the second dielectric layer by a third gap to form a third air dielectric layer;

a fifth, a sixth, a seventh and an eighth antenna arrays, arranged in the 4×4 array manner, fixed to the second metal grounding sheet, and spaced apart from the second metal grounding sheet by a fourth gap to form a fourth air dielectric layer; and a second transmission line device, formed on a side of the second dielectric layer facing the second metal grounding sheet, for transmitting radio-frequency signals to the fifth to eighth antenna arrays; and a feeding device, coupled between the first transmission line device and the second transmission line device, wherein the feeding device is configured for alternately outputting radio-frequency signals to the first complex antenna and the second complex antenna so as to emit wireless signals via the first complex antenna and the second complex antenna, and for switching phases of radio-frequency signals outputted to the first to eighth antenna arrays so as to change characteristics of beam generated by the first to eighth antenna arrays.

2. The antenna system of claim 1, wherein the included angle is in a range of 70 degrees to 150 degrees.

3. The antenna system of claim 1, wherein each of the first to eighth antenna arrays is a 1×2 antenna array, the 1×2 antenna array comprises two unit antennas, and the two unit antennas have identical structures and sizes.

4. The antenna system of claim 3, wherein the feeding device comprises four feeding modules respectively corresponding to two horizontally adjacent antenna arrays of the first to eighth antenna arrays, and each feeding module comprises:

a power divider, comprising an input terminal coupled to a signal source, and two output terminals for distributing radio-frequency signals generated by the signal source to the two output terminals;

a first phase shifters, coupled to one of the two output terminals, and coupled to one antenna arrays of the two horizontally adjacent antenna arrays via the first transmission line device or the second transmission line device, for transmitting radio-frequency signals outputted by the power divider to the antenna array in a plurality of phase states; and a second phase shifters, coupled to another of the two output terminals, and coupled to another antenna arrays of the two horizontally adjacent antenna arrays via the first transmission line device or the second transmission line device, for transmitting radio-frequency signals outputted by the power divider to the another antenna array in the plurality of phase states;

wherein, in one of the plurality of phase states, radio-frequency signals outputted by the first phase shifter and the second phase shifter have no phase difference, and in others of the plurality of phase states, radio-frequency signals outputted by the first phase shifter and the second phase shifter have phase difference;

wherein the first phase shifter and the second phase shifter are respectively switched between at least two phase shift modes, to switch phases of radio-frequency signals outputted to the two horizontally adjacent antenna arrays.

5. The antenna system of claim 4, wherein each of the first phase shifter and the second phase shifter comprises:

an output line, coupled to the first transmission line device or the second transmission line device, corresponding to one of the at least two phase shift modes;

a delay unit, coupled to the first transmission line device or the second transmission line device, corresponding to another of the at least two shift modes; and a switch, coupled to the output line and the delay unit, for transmitting radio-frequency signals outputted by the power divider to one of the output line and the delay unit.

6. The antenna system of claim 3, wherein each of the two unit antennas is a dual-polarized microstrip antenna.

7. The antenna system of claim 6, wherein the first transmission line device and the second transmission line device comprise four transmission line modules respectively corresponding to the first to eighth antenna arrays, and each transmission line module comprises:

a first transmission line, electrically connected to the feeding device and not electrically connected to the dual-polarized microstrip antenna, for transmitting radio-frequency signals to the dual-polarized microstrip antenna by means of coupling feeding; and a second transmission line, electrically connected to the feeding device and the dual-polarized microstrip antenna, for transmitting radio-frequency signals to the dual-polarized microstrip antenna by means of direct feeding, wherein a plurality of slots corresponding to the first transmission line are formed in the first metal grounding sheet and the second metal grounding sheet.

8. The antenna system of claim 1, wherein the first complex antenna further comprises a first reflection sheet disposed beneath the first dielectric layer, and the second complex antenna further comprises a second reflection sheet disposed beneath the second dielectric layer.

* * * * *